United States Patent [19]

Brown

[11] Patent Number: 4,602,411
[45] Date of Patent: Jul. 29, 1986

[54] METHOD FOR FABRICATING A ROTOR DISC ASSEMBLY

[75] Inventor: Ralph D. Brown, Winter Springs, Fla.

[73] Assignee: Westinghouse Electric Corp., Pittsburgh, Pa.

[21] Appl. No.: 570,485

[22] Filed: Jan. 13, 1984

[51] Int. Cl.⁴ .................. B21K 3/00; B23P 11/02; F16B 4/00

[52] U.S. Cl. .................. 29/156.8 R; 29/402.06; 29/402.08; 29/523; 29/447; 72/342; 72/364; 285/382.4; 285/905; 403/277; 403/273

[58] Field of Search .............. 29/523, 156.8 R, 401.1, 29/402.06, 402.08, 447, DIG. 35; 72/342, 364; 285/DIG. 6, 382.4; 403/273, 274, 277

[56] References Cited

U.S. PATENT DOCUMENTS

| | | | |
|---|---|---|---|
| 1,873,956 | 8/1932 | Dahlstrand | 416/198 A X |
| 2,825,124 | 3/1958 | Nichols et al. | 29/156.8 R |
| 3,220,602 | 11/1965 | Ficker | 29/523 |
| 3,304,052 | 2/1967 | Warner et al. | 416/198 A X |
| 3,383,900 | 5/1968 | Van Hartesveldt | 72/364 |
| 3,822,953 | 7/1974 | Adelizzi | 29/447 X |
| 4,330,236 | 5/1982 | LeBreton | 416/244 A X |
| 4,447,944 | 5/1984 | Mohrman | 403/277 X |

FOREIGN PATENT DOCUMENTS 274954 7/1927 United Kingdom ............... 403/277

Primary Examiner—Howard N. Goldberg
Assistant Examiner—R. S. Wallace
Attorney, Agent, or Firm—R. P. Lenart

[57] ABSTRACT

A rotor disc structure is provided with a sleeve within an axial bore of a disc and mounted through a driving connection on a rotor shaft. Before being mounted on the shaft, the sleeve and bore have been plastically deformed such that the sleeve is subjected to compressive stresses. Plastic deformation is accomplished by inserting a plug, having a higher coefficient of thermal expansion than the disc and sleeve, into the heated sleeve and heating the assembled disc, sleeve and plug. The sleeve includes an eccentric turn which fits into a corresponding eccentric portion of the disc bore. Keying occurs at the sleeve-rotor interface to remove stress risers in the disc bore.

8 Claims, 3 Drawing Figures

METHOD FOR FABRICATING A ROTOR DISC ASSEMBLY

BACKGROUND AND SUMMARY OF THE INVENTION

This invention relates to machine rotor structures and more particularly to turbine rotor disc assemblies.

In many instances involving large axial flow elastic fluid utilizing machines, such as steam turbines, the rotor structure is of such a large size that at least some of the blade carrying discs and the rotor shaft are formed separately and assembled by shrink fitting the discs onto the rotor shaft. Stress corrosion cracking can occur at the disc bore-rotor shaft interface of large shrunk-on, low pressure steam turbine discs. In a typical design, these discs are attached to the rotor shaft by a heat shrinking and keying operation. For example, after heat shrinking, three axial keyways may be drilled at equally spaced locations in the disc shaft interface. Keys inserted in these keyways serve to lock the disc onto the shaft and also to transmit torque in case of a loss in shrink fit. Crevices formed by the keys in the keyways become a primary location for the development of stress corrosion cracking. This can result in cracking at the keyways of the shrunk-on discs. Crevices formed between the disc and the rotor shaft can also result in cracks in the bore of the rotor discs.

Stress corrosion cracking requires the presence of an agressive environment, high yield strength material and tensile stresses above some threshold value. The reduction of any of these factors can reduce susceptibility to stress corrosion cracking. Consequently, the elimination of stress risers and the introduction of compressive stresses in the bore of the disc can reduce the disc bore tensile stress below the threshold value. The present invention provides a method of rotor disc structure assembly wherein compressive stresses are inducted in a sleeve and the bore of the disc and the assemblies are then attached to the rotor shaft without the introduction of stress risers in the discs.

A rotor disc assembly constructed in accordance with the present invention comprises: a disc having an axial bore; a sleeve positioned within the axial bore and forming an interference fit with the axial bore wherein the sleeve and disc bore are subjected to compressive stress; and a rotor shaft passing through the sleeve and having a driving connection therewith. The method for constructing this rotor disc structure comprises the steps of: placing a sleeve within a bore in a disc to form a clearance fit between the outside surface of the sleeve and the inside surface of the bore; plastically deforming the sleeve and disc bore to place the sleeve and disc bore in compression; and mounting the assembled disc and sleeve onto a rotor. Before placing the sleeve within the disc bore, the bore may be polished to remove residual tensile stress. The plastic deformation of the sleeve and bore is accomplished by: heating the assembled disc and sleeve to increase the inside diameter of the sleeve; inserting a plug of material having a higher coefficient of thermal expansion than the disc and sleeve, and having an outside diameter larger than the original inside diameter of the sleeve, into the sleeve; heating the assembled plug, disc and sleeve, to plastically deform the sleeve and disc bore; cooling the assembled plug, disc and sleeve, to create compressive stresses within the sleeve and disc bore; and removing the plug. In order to facilitate plug removal, the sleeve may be provided with a taper bore which matches a tapered outer surface of the plug. In that case, the sleeve will be machined to a predetermined internal diameter before being mounted on the rotor shaft. In addition to the interference fit between the disc and the sleeve, the sleeve may also be provided with a turn which is eccentric to its bore which fits into a corresponding eccentric portion of the disc bore to prevent rotation of the disc on the sleeve due to torque being transmitted by the disc to the sleeve. After the disc and sleeve are assembled onto the shaft, the sleeve may be keyed to the shaft in accordance with known techniques. The keyways will not be susceptible to stress corrosion cracking since the stress risers will be in the sleeve, which during operation, will have low tensile stresses. As the rotor shaft assembly reaches operating speed, the disc bore will increase in diameter due to the decrease in bore compressive stresses. Since the compressive stress in the sleeve is also reduced, the sleeve will increase in diameter, thereby maintaining the induced interference fit, and its ability to transmit torque.

DESCRIPTION OF THE PREFERRED EMBODIMENT

Figure 1:
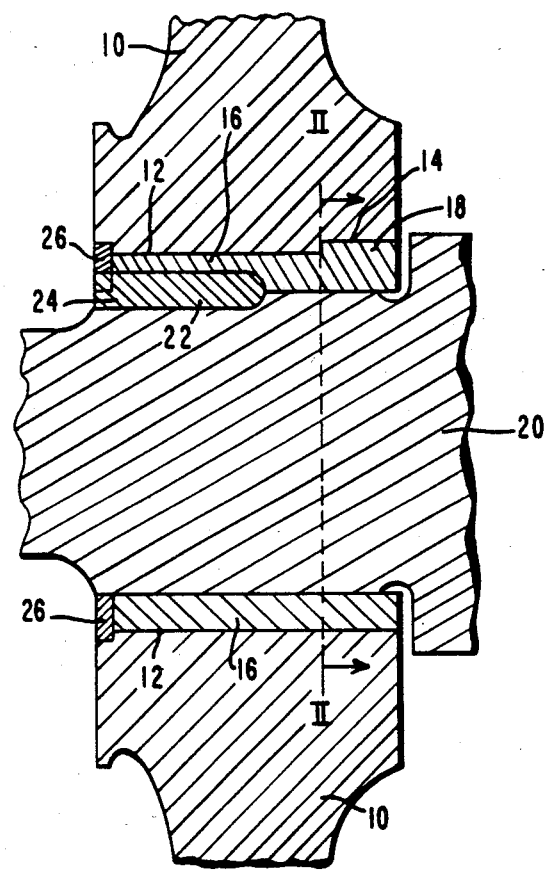
FIG. 1 is a cross section of a rotor disc assembly constructed in accordance with one embodiment of the present invention.

Referring to the drawings, FIG. 1 is a cross section of a shaft disc assembly constructed in accordance with one embodiment of the present invention. Disc 10 is provided with an axial bore 12 which may have been previously polished to remove residual tensile stress, and which includes an eccentric portion 14. Sleeve 16, constructed of the same material as disc 10, is inserted within and forms an interference fit with axial bore 12. Sleeve 16 includes an eccentric turn 18 which corresponds to the eccentric portion 14 of axial bore 12. The disc and sleeve are shrunk fit onto rotor shaft 20 and a plurality of keyways 22 (only one shown) are drilled along the shaft-sleeve interface. A key 24 is inserted into each of the keyways 22. A spacer 26 is fitted at each keyway to axially locate the disc.

Figure 2:
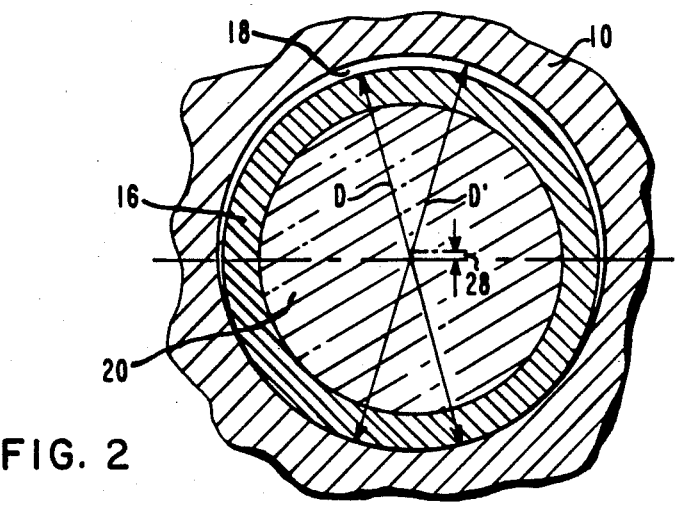
FIG. 2 is a cross section of FIG. 1 taken along line II—II.

FIG. 2 is a partial cross section of the rotor disc assembly of FIG. 1 taken along line II—II. In this Figure, eccentric turn 18 of sleeve 16 is shown to have a diameter D' which is larger than the diameter D of the remainder of sleeve 16. Item 28 illustrates an offset between the axis of eccentric turn 18 and the remainder of sleeve 16.

Figure 3:
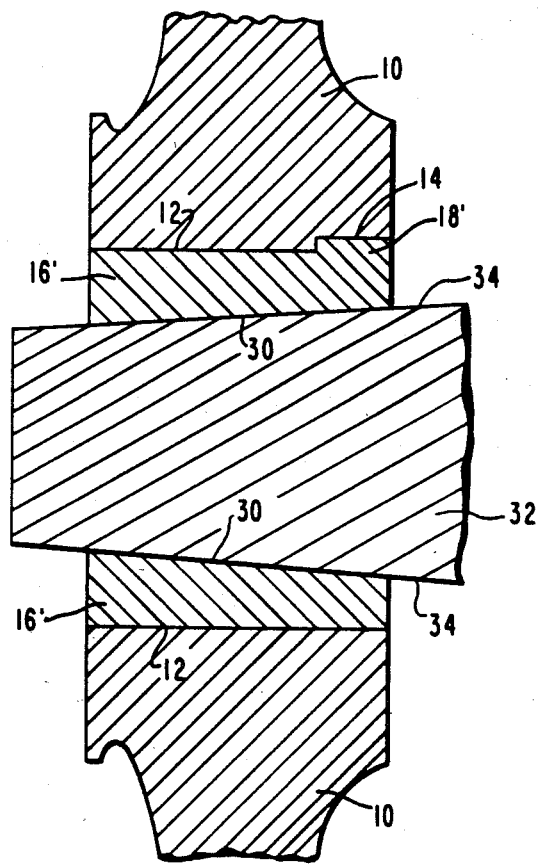
FIG. 3 is a cross-section of a disc and sleeve which serves to illustrate one of the steps of the method of this invention.

The rotor disc assembly of FIG. 1 is constructed in accordance with the method of the invention by performing the steps of: placing sleeve 16 within bore 12 in disc 10 to form a clearance fit between the outside surface of sleeve 16 and the inside surface of bore 12; plastically deforming sleeve 16 to place the sleeve and disc bore in compression; and mounting the assembled disc and sleeve onto shaft 20. The technique used to plastically deform the sleeve 16 is illustrated in FIG. 3. After sleeve 16' has been inserted into bore 12 of disc 10 to form a clearance fit, the assembled disc and sleeve are heated to a predetermined temperature of, for example, 850° F. to increase the inside diameter of the sleeve. Sleeve 16' is initially formed with a tapered interior surface 30. A solid plug comprised, for example, of type A-286 stainless steel and having an outside surface 34 with a taper matching the taper of the inside surface 30 of sleeve 16' is coated with a high temperature lubricant and inserted into the sleeve bore. The assembled plug, sleeve and disc are then heated again to 850° F. Because of the higher coefficient of thermal expansion of the plug (for example, $9.64 \times 10^{-6}$ in/in/°F.) versus that of the disc (for example, $7.4 \times 10^{-6}$ in/in/°F.), plastic deformation of the sleeve 16' and the disc bore 12 takes place during this heating cycle. Then the disc, sleeve and plug are cooled to room temperature and the plug is removed. Now the disc 16' can be finish machined to a predetermined internal diameter and the assembled disc and plastically deformed sleeve and disc bore can be shrunk fit onto the rotor shaft.

The driving connection between the sleeve and rotor shaft created by the shrink fit is augmented by drilling and reaming three equally spaced holes along the sleeve-rotor interface and inserting keys into these holes. This arrangement puts the stress risers from the keyways in the sleeve, which is held in compression by the disc and has operating stresses less than 10% of its yield strength.

Radial pressure between the sleeve and disc induced by the plastic deformation of the sleeve and disc bore will remain until the disc loses its shrink fit from the shaft. Rotation of the disc on the sleeve, which tends to occur as a result of torque forces in a turbine, will be prevented by the friction forces between the sleeve and disc and the eccentric bore and turn of the sleeve and disc.

The method of this invention in which rotor discs and sleeves are prestressed, can be utilized to retrofit discs that have been removed from rotor shafts by overboring the disc to remove existing stress-concentrating structures such as half keyways and any material that might contain microcracks or other material damage in the vicinity of the previous bore. An eccentric portion can be added to the new bore and a sleeve, having a corresponding eccentric turn, inserted. Then the disc and sleeve can be processed as described above and reshrunk onto the rotor shaft. This retrofit process effectively restores the disc bores to their original dimensions while minimizing disc distortion.

Previous methods of heating the disc and inserting a sleeve to cause an interference fit (shrink fit) place the disc bore in tensile stress, thereby increasing its susceptibility to stress corrosion cracking.

Although this invention has been described in terms of what are at present believed to be its preferred embodiments, it will be apparent to those skilled in the art that various changes may be made without departing from the invention. It is therefore intended that the appended claims cover all such changes falling within the scope of the invention.

What is claimed is:

1. A method for constructing a shaft disc assembly comprising the steps of:
   placing a sleeve within a bore in a disc, of the same material as said sleeve, to form a clearance fit between the outside diameter of said sleeve and the inside diameter of said bore;
   heating the assembled disc and sleeve to increase the inside diameter of the sleeve and disc;
   inserting a plug of material, having a higher coefficient of thermal expansion than said disc and sleeve, and having an outside diameter larger than the original inside diameter of said sleeve, into said sleeve;
   heating the assembled plug, disc and sleeve, to plastically deform said sleeve and disc bore;
   cooling the assembled plug, disc and sleeve, to create compressive stress within said sleeve and disc bore;
   removing said plug;
   mounting the assembled disc and sleeve onto a shaft; and
   drilling a plurality of keyways along the shaft-sleeve interface and inserting a key into each of said keyways such that stress risers resulting from said keys and keyways exist in said sleeve but not in said disc.

2. The method of claim 1, wherein said sleeve has a tapered bore and said plug has an outside surface which is tapered to match the taper of said bore.

3. The method of claim 2, further comprising the step of:
   machining said sleeve bore to a predetermined internal diameter, following the removal of said plug.

4. The method of claim 1, further comprising the step of:
   lubricating said plug before said plug is inserted into said sleeve.

5. The method of claim 1, further comprising the step of:
   forming an eccentric portion in said disc bore and a corresponding eccentric turn on said sleeve, before placing said sleeve within said disc bore.

6. The method of claim 1, further comprising the step of:
   polishing said disc bore before placing said sleeve within said disc bore.

7. The method of claim 1, wherein said step of mounting said disc and sleeve onto said rotor comprises the step of:
   shrink fitting said disc and sleeve onto said rotor.

8. A method for retrofitting a disc onto a shaft comprising the steps of:
   removing material adjacent to a bore in a disc, thereby enlarging said bore;
   placing a sleeve, of the same material as said disc, within the enlarged bore to form a clearance fit between the outside diameter of the enlarged bore;
   heating the assembled disc and sleeve to increase the inside diameter of the sleeve and disc;
   inserting a plug of material, having a higher coefficient of thermal expansion than said disc and sleeve, and having an outside diameter larger than the original inside diameter of said sleeve, into said sleeve;
   heating the assembled plug, disc and sleeve, to plastically deform said sleeve and said enlarged disc bore;
   cooling the assembled plug, disc and sleeve, to create compressive stress within said sleeve and said enlarged disc bore;
   removing said plug;
   mounting the assembled disc and sleeve onto a shaft; and
   drilling a plurality of keyways along the shaft-sleeve interface and inserting a key into each of said keyways such that stress risers resulting from said keys and said keyways exist in said sleeve but not in said disc.

* * * * *